United States Patent [19]

Dhooge

[11] Patent Number: 5,047,224

[45] Date of Patent: Sep. 10, 1991

[54] METHOD FOR TREATING ORGANIC WASTE MATERIAL AND AN OXIDATION CATALYST/COCATALYST COMPOSITION USEFUL THEREFOR

[75] Inventor: Patrick M. Dhooge, Corrales, N. Mex.

[73] Assignee: Delphi Research, Inc., Albuquerque, N. Mex.

[21] Appl. No.: 395,649

[22] Filed: Aug. 18, 1989

Related U.S. Application Data

[63] Continuation-in-part of Ser. No. 253,232, Oct. 4, 1988, Pat. No. 4,925,540.

[51] Int. Cl.$^5$ .............................................. C01B 31/20
[52] U.S. Cl. ........................... 423/437; 423/DIG. 18; 210/763; 110/346; 502/225; 502/229; 502/331; 502/338
[58] Field of Search ................. 423/DIG. 18, 437; 210/763; 110/346; 48/197 A; 502/225, 229, 331, 338

[56] References Cited

U.S. PATENT DOCUMENTS

| | | | |
|---|---|---|---|
| 3,641,157 | 2/1972 | Riegel et al. | 568/431 |
| 3,644,561 | 2/1972 | Beard, Jr. | 585/657 |
| 3,658,933 | 4/1972 | Beard, Jr. | 585/657 |
| 4,206,186 | 6/1980 | Hölter et al. | 423/DIG. 18 |
| 4,443,342 | 4/1984 | Stas et al. | 210/763 |
| 4,537,686 | 8/1985 | Borbely et al. | 210/713 |
| 4,552,668 | 11/1985 | Brown et al. | 423/DIG. 19 |
| 4,582,690 | 4/1986 | Rempel et al. | 423/544 |
| 4,624,792 | 11/1986 | Yamanaka et al. | 210/763 |
| 4,699,700 | 10/1987 | Dhooge | 502/224 |
| 4,752,364 | 6/1988 | Dhooge | 204/151 |
| 4,925,540 | 5/1990 | Dhooge | 204/157.042 |

*Primary Examiner*—Anthony McFarlane
*Attorney, Agent, or Firm*—Berman, Aisenberg & Platt

[57] ABSTRACT

An oxidation catalysts/cocatalyst composition of matter is useful in oxidizing organic waste material. Use of the oxidation catalysts/cocatalyst composition causes the reaction rate to increase and causes the energy required for the reaction to decrease. A solution, including the oxidation catalysts/cocatalyst composition, and a reaction medium composition further including organic waste material are also described.

21 Claims, 1 Drawing Sheet

METHOD FOR TREATING ORGANIC WASTE MATERIAL AND AN OXIDATION CATALYST/COCATALYST COMPOSITION USEFUL THEREFOR

This application is a continuation-in-part of application No. 253,232, filed Oct. 4, 1988 now U.S. Pat. No. 4,925,540.

RELATED APPLICATIONS Statement

This invention was made with the support of the State of New Mexico under Project No. 2-77-5617 awarded by the New Mexico Research and Development Institute. The State of New Mexico has reserved rights in this invention.

The subject matter of this application is related to that of applications Ser. Nos. 864,410 (now U.S. Pat. No. 4,752,364), filed May 19, 1986, and 864,411 U.S. Pat. No. 4,699,70, filed May 19, 1986.

FIELD OF THE INVENTION

This invention relates to the use of a catalyst composition, comprising a catalyst for oxidation of organic compounds, catalyst for oxidation of iron(II) by air, and a homogeneous cocatalyst for oxidation of organic compounds, for the gasification of organic waste material.

BACKGROUND OF THE INVENTION

Carbonaceous materials are oxidized when suspended in a solution containing iron(III)/iron(II), copper(II)/copper(I), chloride ion, hydronium ion and a homogeneous cocatalyst. The organic carbon is converted to $CO_2$ by oxidation with molecular oxygen or oxygen-containing gas, liquid or solid mixture.

U.S. Pat. No. 4,105,755 concerns reacting an ash-containing carbonaceous material, optionally an organic waste material, with a halogen, to form a halogen acid, and then decomposing the halogen acid to halogen (recycled) and hydrogen. The halogen acid is preferably decomposed electrolytically if this step of the reaction takes place as a separate step from the initial reaction of the ash-containing carbonaceous material and halogen.

SUMMARY OF THE INVENTION

An object of the present invention is to provide an oxidation reactor system in which organic waste material is oxidized by oxygen using an oxidation catalysts/cocatalyst combination. The over-all reaction is:

The process employs one of several homogeneous cocatalysts to improve the organic oxidation rate and/or to lower the activation energy for the oxidation of the organic waste material.

Another object of the invention is to provide a method of using an oxidation catalysts/cocatalyst composition for the treatment of organic waste material. A further object of the invention is to provide a solution composition comprising organic waste material, a dispersed oxygen or air stream, oxidation catalysts and cocatalyst.

There are several distinct aspects of this invention:
a) a catalysts/cocatalyst composition,
b) use of (a) in a method of oxidizing organic waste material,
c) use of (a) to reduce energy required to gasify organic waste material,
d) a solution composition comprising (a), and
e) a reaction medium composition comprising organic waste material in (d).

Component (a) is an indispensable subcombination of each of the other aspects of the invention. The dispersion of (a) throughout the solution composition imparts homogeneity to the distribution of the cocatalyst and of the oxidation catalysts.

The benefits derived from the use of the oxidation catalysts/cocatalyst are many. The process for treating organic waste material significantly reduces the amount of the solids, producing gaseous products and some residue; it minimizes the amount of waste material which must be dumped or otherwise disposed of. The oxidation composition renders viruses, bacteria, fungi, spores and the like nonviable within one minute. Likewise, an increase in reaction rates using the oxidation catalysts/cocatalyst combination (a) provides energy-saving economy.

DETAILED DESCRIPTION OF THE INVENTION

Figure 2:
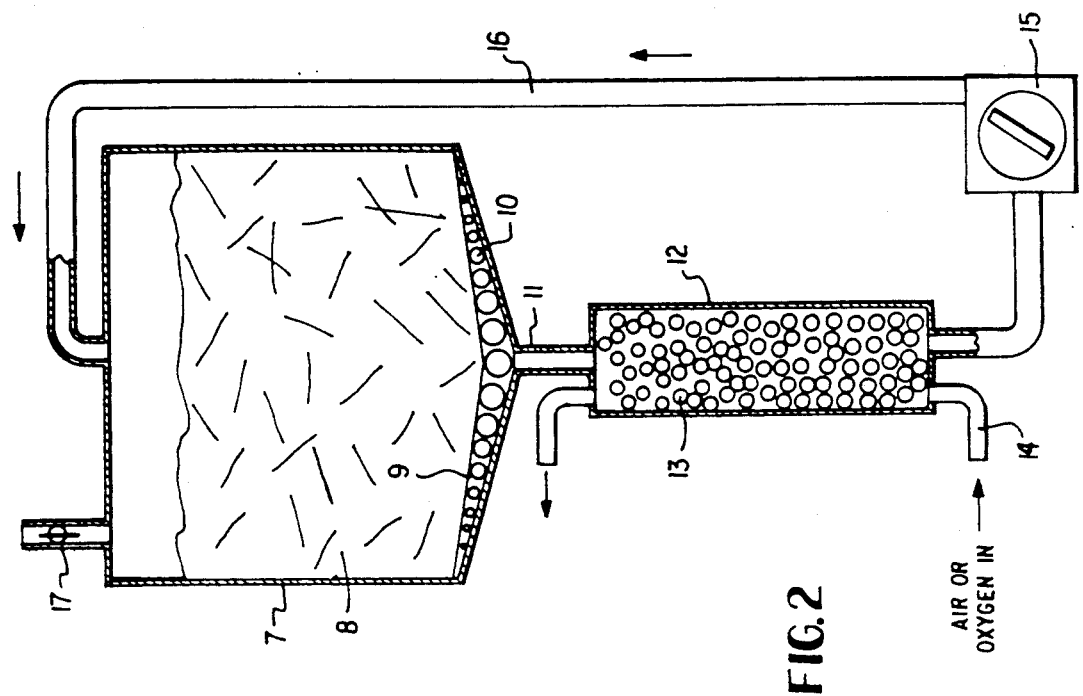
FIG. 2 is a vertical sectional view of apparatus in which the organic reaction area and oxygen dispersion area are separated.

In the process of the invention organic waste material is oxidized by molecular oxygen. The reaction is a catalyzed reaction in which a reversible redox couple acting as a catalytic system oxidizes carbon of the organic waste material. The products of the carbon oxidation are carbon oxides. The reduces form of the redox couple is then catalytically oxidized by molecular oxygen. The process described herein employs iron(III)/iron(II) as the reversible redox couple, copper(II)/copper(I) as the iron(II) oxidation catalyst and one of several homogeneous cocatalysts to improve the organic oxidation rate and/or to lower the activation energy required for the oxidation of the organic material. Obtained data show that the mechanism of the organic oxidation is changed by the homogeneous cocatalyst, which apparently forms an electron transfer complex involving iron(III). This results in improvement in reaction rate and/or lowering of activation energies. Iron(II) oxidation by oxygen is catalyzed by copper ions, which also results in improvement in the reaction rate for the organics oxidation by maintaining the iron ions in the oxidized state.

The electron transfer complex must exist at least momentarily to account for increased oxidation rates and lowered activation energies of the reactions taking place. It is postulated that the oxidation mechanism involves a short-lived coordination complex between the organic compound and the homogeneous cocatalyst. An example of such a complex is that of platinum ions or palladium ions with the double bonds of organic compounds, e.g., Ziese's salt anion, the trichloro (ethylene) platinate(II) ion. Complexes such as Ziese's salt anion are stable in aqueous solution. Similar platinum-organic double-bond complexes are apparently formed in catalyst mixtures of this invention. The standard potential of the iron(II)/iron(III) redox couple in 1.0M sulfuric acid is +0.69V. The standard potential of platinum(IV)/platinum(II) redox couple in 1.0M sulfuric acid is also approximately +0.69V. Thus, the platinum(II) species is in equilibrium with the platinum(IV) species, iron(III) and iron(II), and can be considered to be complexed for at least short periods of time to organic double bonds or other appropriate functionality on the organic compounds. The increase in reaction rate produced by platinum, palladium, rhodium and ruthenium is due to the fact that the homogeneous cocatalyst/organic complexes are more long-lived than the organics oxidation catalyst/organic complexes and thus are more efficient at transferring electrons. Lowered activation energies are accounted for by the lower activation energy necessary for formulation of the organic compound-homogeneous cocatalyst complex. The required supply of oxidizing electrons can be derived from direct reduction of the cocatalyst, followed by reoxidation by oxygen/organics oxidation catalyst, or by formation of a short-lived organics oxidation catalyst/cocatalyst/organic complex in which the cocatalyst compound acts as a bridge to transfer an electron from the organic compound to the organics oxidation catalyst and from there to the oxygen. Thus, the electron transfer complex (ETC) involved in the oxidation forms spontaneously when the homogeneous cocatalyst is added to a solution containing dissolved or suspended organic compounds which have functional groups or bonds capable of interacting with the cocatalyst. Iron(II), the reduced form of the organics oxidation catalyst, is oxidized to iron(III) by molecular oxygen in the presence of soluble copper ions, hydronium ions and chloride ions. The exact mechanism of the iron(II) → iron(III) oxidation reaction is not clear, but is believed to involve oxidation of iron(II) by copper(II) complexed at least partially with chloride ions. In the iron oxidation, copper(II) is reduced to copper(I). Copper(I) is then oxidized to copper(II) by oxygen in the presence of chloride ions and hydronium ions. The relative weight ratios vary with the type of organic compound, the type of cocatalyst and the oxidation catalysts. Preferred ranges of proportions for each component are relatively large amounts of organic material (an activity for the organic of 1 or more), a great concentration of the oxidation catalysts (activities of 0.1 to 1.0 or more) and a smaller concentration of the cocatalyst compound (activity of 0.01 to 0.001 or less). The ETC is formed in a solution which solvates the catalysts and at a temperature of 0° C. or higher with an organic material with functionalities which can interact with the cocatalyst, and in the absence of any interfering conditions, such as species which tie up or precipitate the catalysts. The species which precipitate the catalysts are those which form insoluble salts with the catalysts, such as (for the metals) hydroxide, silicate, sulfide, high concentrations of sulfate or high concentrations of phosphate. Species or substances which tie up the catalysts include highly absorptive inert materials such as clay or activated carbon, or compounds with which the catalysts react irreversibly.

The oxidation catalysts are obtained as pure catalyst, from various salts or compounds of the oxidation catalysts, or from impurities in the organic material.

The solutions usually used in the catalytic system dissolve many metal oxides, sulfides, many metal salts, etc. If any of these compounds exist as impurities in the organic waste used in the reactor, they will be leached out by the solution. Iron is one of the most common metals found in sewage sludge, manure and many other biological wastes, and so can supply part or all of the organics oxidation catalyst once leached from the organic material. The oxidation catalysts are usually added to the solution, as there is not enough normally found in waste materials to develop the desired reaction rate, but some waste materials will supply their own organics oxidation catalyst, e.g., when leachable iron is present in sufficient quantity in the waste material. It is doubtful that any waste material will contain sufficient quantities of copper, nickel, platinum, vanadium, etc., to supply its own iron(II) oxidation catalyst or homogeneous cocatalyst as well, but such is not precluded. Whether the oxidation catalysts and the cocatalyst are added as metals, metal salts, etc., or leached from the organic waste material does not affect the nature of the process described herein. The catalyst materials are identified by chemical analysis of the waste material to determine catalyst content (if any), and by chemical analysis of the solution (after it has been thoroughly mixed with the waste and allowed to stand for, e.g., from 24 to 72 hours).

The homogeneous cocatalyst is optionally obtained from pure cocatalyst metal, from various salts or compounds of the cocatalyst, or from impurities in the organic material. The homogeneous cocatalyst is dissolved in or homogeneously distributed throughout the catalyst solution. This is advantageous in that it eliminates one heterogeneous step in the process of transfer of electrons from the organics oxidation catalyst and in that the cocatalyst is available to the entire surface of any solid organic particles immersed in the catalyst solution. The cocatalyst is homogeneous with the oxidation catalysts solution, it is a single ion complex (not an admixture), and the homogeneity of the cocatalyst is very critical to the increased reaction rates observed.

The catalyst solution is any solution in which the oxidation catalysts and cocatalyst are soluble, but is typically a solution of a strong mineral acid, such as hydrochloric acid or sulfuric acid. The acid solution provides a solubilizing medium for the catalyst composition. The system is satisfactorily operated at various temperatures, depending on the catalyst combination and the organic source; temperatures from 70° C. to 200° C. are typical. However, temperatures from 0° C. to 500° C. or more may be used.

The principle advantage of the process is that it effects the oxidation (without burning or biological digestion) of most organic material directly to simple compounds. Chemical analysis of gaseous products and anolyte solutions after oxidation indicates that the process is clean and efficient, leaving little residue.

Examples of organic waste material or biomass suitable for practicing the invention are regulated medical waste, woody wastes, cattle manure, sewage sludge, various industrial chemical wastes, food and fiber processing by-products or waste, or any organic material which has a positive cost of disposal.

Examples of oxidation catalysts/cocatalyst compositions useful for practicing the invention are various combinations of metal ion complexes. The complexes vary and depend upon the composition of the solution and the nature of the organic waste material. Iron(III)-

/iron(II) ion and copper(II)/copper(I) ion complexes are the oxidation catalysts. Non-limiting examples of homogeneous cocatalysts are platinum(IV) ion complex, ruthenium(III) ion complex, rhodium(II) ion complex, nickel(II) ion complex, cobalt(II) ion complex palladium(II) ion complex, copper(II) ion complex and vanadium(V) oxide complex. The catalyst solutions are made by dissolving the metal, and/or soluble metal salt in an aqueous solution. Useful combinations of oxidation catalysts and homogeneous cocatalyst include:

| iron (III)/iron (II), copper (II)/ copper (I) with platinum (IV) | (urea, wood cellulose, manure and/or fat) |
| iron (III)/iron (II)/copper (II)/ copper (I) with vanadium (V) | (sewage sludge) |
| iron (III)/iron (II), copper (II)/ copper (I) with cobalt (II) | (wood cellulose and/or manure) |
| iron (III)/iron (II), copper (II)/ copper (I) with palladium (II) | (fat) |
| iron (III)/iron (II), copper (II)/ copper (I) with nickel (II) | (manure) |
| iron (III)/iron (II), copper (II)/ copper (I) with ruthenium (III) | (wood cellulose, coal, paunch, blood, protein, others) |

In practicing the invention, an aqueous solvent, an organic oxidation catalyst, an iron(II) →iron(III) oxidation catalyst, chloride ion, hydronium ion and a homogeneous oxidation cocatalyst are combined for oxidizing organic waste material.

The range of oxidation catalyst concentrations providing a suitable reaction rate is from 0.01M up to saturation. The preferred range is 0.1M up to 1.0M. The range of cocatalyst providing an appropriate reaction rate is from 0.0001M to 0.1M. The preferred range is from 0.001M to 0.01M. The preferred ranges provide economy of operation.

The oxidation solution optionally has many different compositions. Various other acids which are suitable are perchloric acid, hydrobromic acid, nitric acid, boric acid, hydrofluoric acid, or any other strong acid which is not irreversibly degraded in the system. The important attributes of the solvent are that it is able to solvate the oxidation catalysts and homogeneous cocatalyst, and that it does not degrade in the oxidation system.

Oxygen can be most easily supplied in the form of air. Membrane technology can be used to enrich the oxygen content of the air, and pure oxygen can even be used. To aid the reaction, a high surface area material can be added to the catalyst solution. The material will provide more interaction between the catalysts and oxygen. High surface area materials suitable for this use include powdered alumina and molecular sieve.

Figure 1:
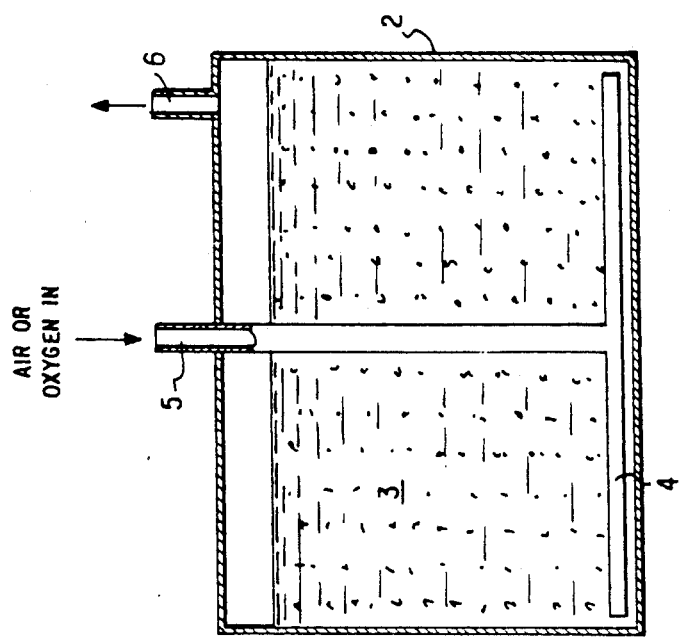
FIG. 1 is a vertical sectional view of an apparatus useful for practicing the invention.

Referring now to the Figures, FIG. 1 shows an apparatus suitable for practicing the invention. Tank 2 contains solution 3 in which disperser 4 is immersed. Solution 3 is a solution containing oxidation catalysts and homogeneous cocatalyst together with the organic waste material. Tube 5 carries oxygen-containing gas (most probably air) to disperser 4. Vent 6 allows release of gases from the reactor. FIG. 2 shows tank 7 which contains a mixture 8 of solvent, oxidation catalysts, homogeneous cocatalyst and organic waste material resting on optional filter screen 9. Organic waste material is reacted with catalyst combination in tank 7, and catalyst solution 10 flows through exit 11 to column 12, which contains support material 13 over which air or oxygen 14 is flowed. Solution from the column is returned via pump 15 and conduit 16 to tank 7 for reuse. Gases generated in tank 7 are withdrawn therefrom through vent 17. Waste material in tank 7 is mixed with catalyst solution by percolation, spraying, stirring, density gradient or other method. Oxidation catalyst which is reduced in tank 7 is reoxidized in column 12 before being returned to tank 7.

Operating limitations are principally imposed by the materials used in construction of the reactor system. The system may be built of very inert, strong, expensive materials, such as a quartz-lined steel, and operated at relatively high temperatures (100° to 500° C. or more) or it may be made from inexpensive materials, such as polypropylene or polyethylene and ordinary glass, and operated at temperatures at 20° C. to 120° C.

Elevated temperatures are used when oxidizing a refractory organic compound, such as lignin, chitin or a saturated aliphatic hydrocarbon; or when excess heat energy is available at low cost. The pressure in the system will vary depending on the nature of the solvent and the organics. In acidic aqueous solutions the system pressure will generally reflect the vapor pressure of hydrogen chloride above the solution. Since the typical concentration of chloride is 1.0M, the pressure will typically be that of a 1.0M HCl solution at the operating temperature.

An increase in temperature increases the reaction rate and reduces the necessary size of the reactor for oxidizing a given amount of organic waste material in applications where space is at a premium or rapid oxidation is desired. The acidity of the electrolyte solution affects the reaction rate by aiding in the decomposition of the organic waste compounds due to dehydration and other acid catalyzed reactions.

For oxidative degradation of organic waste material, catalyst and reactor conditions are chosen to insure maximum conversion of the organic waste to an easily disposable form. Strong acid solutions (1M or more) and active catalysts are selected. Useful combinations for oxidative degradation include:

1.0M iron(III)/1.0M copper(II)/0.001M platinum(IV)-/fats, wood cellulose or sewage sludge/3.0M hydrochloric acid;

1.0M iron(III)/1.0M copper(II)/0.01M vanadium(V)-/sewage sludge/3M hydrochloric acid; and 1.0M iron(III)/1.0M copper(II)/0.001M ruthenium-(III)/ cellulose, coal, paunch, blood, protein/3.0M hydrochloric acid.

The temperature of the reactor should preferably be maintained at 95° C. or more for most applications, but for some materials, such as blood, a lower reaction temperature is suitable.

Table I, below, tabulates non-limiting examples of organic material, organics oxidation catalyst, homogeneous cocatalyst, solvent, reaction rate, and activation energy, particularly pointing out the advantageous effect when a homogeneous cocatalyst is used in combination with an organics oxidation catalyst contrasted with the use of the organics oxidation catalyst alone. The reaction rate is significantly increased using the combination of organics oxidation catalyst and homogeneous cocatalyst of the invention.

Table II, below, tabulates non-limiting examples of iron(II) oxidation catalyst, organics oxidation catalyst, homogeneous cocatalyst, solvent and iron(II) oxidation rate, demonstrating the advantage of using copper ions in the presence of chloride ions and hydronium ions contrasted with iron(II) alone in the presence of chloride ions and hydronium ions. The iron(II) oxidation rate is significantly increased in the presence of copper ions when chloride ion and hydronium ion are present.

balt(II) is prepared by diluting 0.083 liter of concentrated hydrochloric acid, 270 grams of ferric chloride hexahydrate, 135 grams of cupric chloride hydrate (for-

TABLE I

| Organic | Organics Oxidation Catalyst | Homogeneous Cocatalyst | Medium | Reaction Rate (sec$^{-1}$) | $E_A$ (kcal/mole) |
|---|---|---|---|---|---|
| Coal | Iron (III) | Ruthenium (III) | 2 M $H_2SO_4$ @ 100° C. | 7.5 × 10$^{-6}$ | 11.1 |
| Coal | Iron (III) | None | 2 M $H_2SO_4$ @ 100° C. | 2.1 × 10$^{-6}$ | 11.8 |
| Blood | Iron (III) | Ruthenium (III) | 2 M $H_2SO_4$ @ 100° C. | 5.7 × 10$^{-7}$ | 8.3 |
| Paunch | Iron (III) | Ruthenium (III) | 2 M $H_2SO_4$ @ 100° C. | 9.7 × 10$^{-6}$ | 16.7 |
| Wood Cellulose | Iron (III) | None | 6 M $H_2SO_4$ @ 50° C. | 1.4 × 10$^{-6}$ | 12.0 |
| Wood Cellulose | Iron (III) | Cobalt (II) | 6 M $H_2SO_4$ @ 50° C. | 4.1 × 10$^{-6}$ | 11.3 |
| Wood Cellulose | Iron (III) | Platinum (IV) | 6 M $H_2SO_4$ @ 50° C. | 3.6 × 10$^{-6}$ | 8.1 |
| Beef fat | Iron (III) | None | 1 M $H_2SO_4$ @ 20° C. | <1 × 10$^{-9}$ | — |
| Beef fat | Iron (III) | Platinum (IV) | 1 M $H_2SO_4$ @ 20° C. | 4.7 × 10$^{-7}$ | 4.5 |
| Beef fat | Iron (III) | Palladium (II) | 1 M HCl @ 20° C. | 2.2 × 10$^{-6}$ | — |
| Urea | Iron (III) | None | 1 M $H_2SO_4$ @ 20° C. | 4 × 10$^{-9}$ | — |
| Urea | Iron (III) | Ruthenium (III) | 1 M $H_2SO_4$ @ 20° C. | 2.2 × 10$^{-8}$ | — |
| Urea | Iron (III) | Platinum (IV) | 1 M $H_2SO_4$ @ 20° C. | 1.2 × 10$^{-6}$ | 4.8 |
| Cattle manure | Iron (III) | None | 6 M $H_2SO_4$ @ 50° C. | 4.0 × 10$^{-7}$ | 12.3 |
| Cattle manure | Iron (III) | Platinum (IV) | 6 M $H_2SO_4$ @ 50° C. | 1.1 × 10$^{-6}$ | — |
| Cattle manure | Iron (III) | Cobalt (II) | 6 M $H_2SO_4$ @ 50° C. | 1.2 × 10$^{-6}$ | 8.0 |
| Cattle manure | Iron (III) | Nickel (II) | 6 M $H_2SO_4$ @ 50° C. | 8.0 × 10$^{-7}$ | — |
| Sewage sludge | Iron (III) | None | 6 M $H_2SO_4$ @ 50° C. | 1.2 × 10$^{-6}$ | 18.7 |
| Sewage sludge | Iron (III) | Vanadium (V) | 6 M $H_2SO_4$ @ 50° C. | 3.8 × 10$^{-6}$ | 13.3 |

TABLE II

| Organics Oxidation Catalyst and Concentration (moles/liter) | Homogeneous Cocatalyst and Concentration (moles/liter) | Iron (II) Oxidation Catalyst and Concentration (moles/liter) | Medium | Iron (II) Oxidation Rate (sec$^{-1}$) |
|---|---|---|---|---|
| 0.5 M Iron (II) | 0.001 M Ruthenium (III) | 0.000 M Copper (II) | 0.15 M $H_2SO_4$/0.5 M NaCl | 1.2 × 10$^{-5}$ |
| 0.5 M Iron (II) | 0.001 M Ruthenium (III) | 0.000 M Copper (II) | 0.15 M $H_2SO_4$/3.0 M HCl | 1.7 × 10$^{-5}$ |
| 0.5 M Iron (II) | 0.001 M Ruthenium (III) | 0.01 M Copper (II) | 0.15 M $H_2SO_4$/0.5 M NaCl | 1.5 × 10$^{-5}$ |
| 0.5 M Iron (II) | 0.001 M Ruthenium (III) | 0.1 M Copper (II) | 0.15 M $H_2SO_4$/0.5 M NaCl | 2.5 × 10$^{-5}$ |
| 0.5 M Iron (II) | 0.001 M Ruthenium (III) | 1.0 M Copper (II) | 0.15 M $H_2SO_4$/0.5 M NaCl | 3.8 × 10$^{-5}$ |
| 0.5 M Iron (II) | 0.001 M Ruthenium (III) | 0.1 M Copper (II) | 0.15 M $H_2SO_4$/1.0 M HCl | 3.3 × 10$^{-5}$ |
| 0.5 M Iron (II) | 0.001 M Ruthenium (III) | 0.1 M Copper (II) | 0.15 M $H_2SO_4$/3.0 M HCl | 5.7 × 10$^{-5}$ |
| 0.5 M Iron (II) | 0.001 M Ruthenium (III) | 0.1 M Copper (II) | 1.5 M $H_2SO_4$ | 1.5 × 10$^{-5}$ |
| 0.5 M Iron (II) | 0.001 M Ruthenium (III) | 1.0 M Copper (II) | 0.15 M $H_2SO_4$/1.0 M HCl | 5.9 × 10$^{-5}$ |
| 0.5 M Iron (II) | 0.001 M Ruthenium (III) | 1.0 M Copper (II) | 0.15 M $H_2SO_4$/3.0 M HCl | 1.2 × 10$^{-4}$ |

In practicing the invention, the mechanism of organic oxidation is changed by addition of the homogeneous cocatalyst to the organics oxidation catalyst and by formation of an electron transfer complex involving the organics oxidation catalyst, homogeneous cocatalyst and the organic waste material. The electron transfer complex has not been characterized but its presence is demonstrated by the reduced activation energies and/or increased reaction rates in the presence of homogeneous cocatalyst as opposed to use of the organics oxidation catalyst alone, as shown in Table I. The rate of iron(II) oxidation is catalyzed by copper ions as has been shown in Table II. The use of the combination of oxidation catalysts and homogeneous cocatalyst of the invention results in the increase in reaction rate and/or a decrease in activation energies.

The invention is further illustrated by the following examples in which all parts and percentages are by weight unless otherwise indicated. These non-limiting examples are illustrative of certain embodiments designed to teach those skilled in the art how to practice the invention and represent the best mode contemplated for carrying out the invention.

EXAMPLES

EXAMPLE 1

A catalyst solution of 1.0M hydrochloric acid containing 1.0M iron(III), 1.0M copper(II) and 0.01M comula weight=135 grams) and 2.38 grams of cobalt chloride hexahydrate to one liter with water. The resulting solution is stirred throughly to dissolve the salts. This solution is then transferred to the tank of FIG. 1. A fritted glass disk is used to disperse air in the tank. Approximately 6 grams of sawdust, or other source of cellulose, is added to the tank, following which the tank is heated to 95° C. The reaction has a rate constant of approximately 3.5 × 10$^{-6}$ sec$^{-1}$ (activation energy=11 kcal/mole). Analysis of the gaseous products from the oxidation shows only carbon dioxide. The reactor tank can be of virtually any size, although up to a point economics of scale favor a large reactor volume.

EXAMPLE 2

The reactor tank of FIG. 2 is loaded with a supported bed of 500 grams of wood chips over filters of 1.0 mm and 0.25 mm Teflon ® screen. A solution of 1.0M hydrochloric acid containing 1.0M iron(III), 1.0M copper-(II) and 0.01M cobalt(II) is prepared by diluting 0.83 liters of concentrated hydrochloric acid, 2700 grams of ferric chloride hexahydrate, 1350 grams of cupric chloride hydrate (formula weight=135 grams) and 23.8 grams of cobalt chloride hexahydrate to 10 liters with water. The solution is agitated to dissolve the salts and then transferred into the reactor tank. The reactor tank is sealed, and the catalyst solution is pumped from the tank through a column and back into the tank. The reactor tank is heated to about 95° C. Air is counter-flowed through the column. The reaction tank volume is about twice the volume of the solution in liters, and the reaction rate is about $1 \times 10^{-5} \text{sec}^{-1}$. Total reaction time is dependent on the flow rate. With a flow rate of 4 liters/sec, a reaction tank volume of 20 liters and a tank loading of 500 grams wood chips, total reaction is achieved in about 46 hours.

EXAMPLE 3

The reactor tank of FIG. 2 is loaded with shredded, regulated medical waste (weight variable) in a basked of 1.0 mm Teflon ® screen. A solution of 1.0M hydrochloric acid containing 0.5M iron(II), 0.1M copper(II) and 0.001M ruthenium(III) is prepared by diluting 0.83 liters of concentrated hydrochloric acid, 1350 grams of ferric chloride hexahydrate, 135 grams of cupric chloride hydrate (formula weight=135 grams) and 2.07 grams ruthenium trichloride to 10 liters with water. The solution is agitated to dissolve the salts and then transferred into the reactor tank. The reactor tank is sealed, and the catalyst solution is pumped from the tank through a column and back into the tank. The reactor tank is heated to about 95° C. for approximately 20 minutes. Air is counter-flowed through the column. The reaction tank volume is about twice the volume of the solution in liters, and the reaction rate is variable depending on the constituents of the waste. Most plastics, glass and rubber are not oxidized in this period. Metal sharps, such as hypodermic needles and scalpel blades, are dissolved by the catalyst solution. All viruses, fungi, bacteria and spores are rendered non-viable. Some amount of the biological organic material in the waste is oxidized. After the exposure period, the air flow and pump are stopped, the tank unsealed and the basket lifted out and rinsed. The waste can be disposed of as unregulated solid waste material.

Variations and modifications may be effected within the scope of the invention as described above, and as defined in the appended claims. Throughout the disclosure and claims all references to "homogeneous cocatalyst" means that the cocatalyst is substantially uniformly dispensed throughout the solution.

What is claimed is:

1. A catalyst composition which comprises, in combination:
   a) organics oxidation catalyst iron (III)/iron (II),
   b) iron (II) oxidation catalyst copper (II)/copper (I), and
   c) homogeneous cocatalyst.

2. A composition according to claim 1 wherein the homogeneous cocatalyst is a member selected from the group consisting of platinum (IV) ion complex, ruthenium (III) ion complex, rhodium (III) ion complex, nickel (II) ion complex, cobalt (II) ion complex, palladium (II) ion complex and vanadium (V) ion complex.

3. A composition according to claim 1 in combination with aqueous solvent in which it is dissolved, the resulting combination being in solution form.

4. A composition according to claim 3 wherein component (b) is in the presence of chloride and hydronium ions.

5. A reaction medium wherein organic waste material is in combination with a composition according to claim 4.

6. A method for gasifying organic waste which comprises:
   combining organic waste material with a catalyst composition according to claim 4, and
   conducting an oxidation reaction between the organic material and oxygen in the catalyst solution.

7. A method according to claim 6 wherein the homogeneous cocatalyst is a member selected from the group consisting of platinum (IV) ion complex, ruthenium (III) ion complex, rhodium (III) ion complex, nickel (II) ion complex, cobalt (II) ion complex, palladium (II) ion complex and vanadium (V) ion complex.

8. A method according to claim 6 which comprises admixing the organic waste material with catalyst in a reaction tank and maintaining an oxygen or air flow through the catalyst solution.

9. A method of claim 6 comprising treating the organic waste material in a tank, circulating solution containing the catalyst composition to a column for oxidation for oxygen, and recirculating the solution containing oxidation catalysts and homogeneous cocatalyst to the tank for treating organic waste material therein.

10. A method of claim 9 comprising flowing oxygen-containing gas through the column.

11. A method of claim 9 comprising flowing oxygen-containing liquid or solid through the column.

12. A method of claim 6 which is carried out at a temperature of from 0° C. to 500° C.

13. A method of claim 6 wherein ultrasonic energy is used to increase the reaction rate.

14. A method of claim 6 wherein the catalyst combination increases the reaction rate by an amount greater than that attributable to the additive effect of said oxidation catalysts and said homogeneous cocatalyst, when each is used alone.

15. A method of claim 8 comprising dispersing oxygen-containing gas in the reaction tank.

16. A method of claim 8 comprising dispersing oxygen-containing liquid or solid in the reaction tank.

17. A method of claim 8 comprising dissolving the catalyst combination in its reduced from in the solvent.

18. A method of claim 8 which further comprises adding a high surface area material to the tank.

19. A process for gasifying organic waste which comprises combining organic waste material with solvent containing a catalyst composition of claim 1 in the presence of chloride and hydronium ions, and dispersing oxygen-containing gas, liquid or solid through the resulting mixture, the process being effected at a reaction rate, at a given temperature, which is attributable to the catalyst combination and which is greater than the sum of catalytic effects of respective components of said catalyst composition.

20. A process for gasifying organic waste which comprises combining organic waste material with solvent containing a catalyst composition of claim 1 in the presence of chloride and hydronium ions, and dispersing oxygen-containing gas, liquid or solid through the resulting mixture, wherein, at a given temperature, obtained reaction activation energy required to oxidize the organic waste material is decreased a greater amount by the catalyst composition than by the combined catalytic effects of each component of said catalyst composition.

21. A catalyst composition which comprises, in combination:
   a) organics oxidation catalyst iron (III)/iron (II),
   b) iron (II) oxidation catalyst copper ions, and
   c) homogeneous cocatalyst.

* * * * *